United States Patent [19]
Cerminara et al.

[11] Patent Number: 5,966,280
[45] Date of Patent: Oct. 12, 1999

[54] MODULAR, DISTRIBUTED EQUIPMENT LEAKAGE CIRCUIT INTERRUPTER

[75] Inventors: Frank A. Cerminara; Joel A. Rossbach, both of Rochester; John A. Wargo, Macedon, all of N.Y.; Raymond H. Legatti, Clearwater, Fla.

[73] Assignee: Xerox Corporation, Stamford, Conn.

[21] Appl. No.: 08/111,332

[22] Filed: Aug. 24, 1993

[51] Int. Cl.$^6$ ................................................ H02H 3/00
[52] U.S. Cl. .............................. 361/47; 361/42; 361/45
[58] Field of Search ................................ 361/42, 45, 47

[56] References Cited

U.S. PATENT DOCUMENTS

| | | | |
|---|---|---|---|
| 3,812,400 | 5/1974 | Gryctko | 361/42 |
| 3,937,937 | 2/1976 | McVey | 235/153 |
| 4,686,600 | 8/1987 | Morris | 361/42 |

*Primary Examiner*—Stephen W Jackson
*Attorney, Agent, or Firm*—Ronald F. Chapuran

[57] ABSTRACT

A modular leakage current detector and machine interrupter including a sense module for detecting ground fault currents in excess of a given value, the sense module including circuitry to provide an interrupt signal, a circuit interrupter interconnected to the sense module to disconnect power to the machine upon receipt of the interrupt signal, and a test and control module electrically connected to the sense module, the test and control module providing a fault signal to periodically test the operability of and reset the modular leakage current detector and machine interrupter.

7 Claims, 4 Drawing Sheets

MODULAR, DISTRIBUTED EQUIPMENT LEAKAGE CIRCUIT INTERRUPTER

BACKGROUND OF THE INVENTION

The invention relates to a residual current detector, and more particularly, to a modular, distributed equipment leakage circuit interrupter.

Various techniques have been used to minimize operator exposure to safety hazards such as moving parts, electrical charge or chemicals during machine operation. For example, safety interlock switches that inhibit machine operation when covers or doors are open with exposure to safety hazards are well known in the prior art. Also, well known are ground fault protection systems for electrical equipment to reduce risk of electric shock and injury to personnel and reduce the risk of fire caused by internal current flow.

A difficulty with the prior art ground fault protection systems is that often such systems must be mounted in a service entrance panel, in a wall mounted outlet box, or in an electrical drop box. These prior art systems are often designed for electrical facilities and not for integration into products. Another difficulty is that prior art systems often operate over only a limited current or voltage range. In these prior art systems, many different parts and components are often required to cover various anticipated applications. For example, some prior art systems require a separate power source and therefore cannot provide complete and reliable protection for a product.

It is an object of the present invention, therefore, to provide a new and improved ground fault protection system that is self powered to provide maximum reliability and safety and that is modular and distributed to allow the system to be used with a wide range of products Another object of the present invention is to provide a ground fault protection system that allows various components to be mounted remotely from one another. Still another object of the present invention is to provide a ground fault protection system that is capable of direct integration into products or for use in an enclosure mounted in or near the product. Further advantages of the present invention will become apparent as the following description proceeds and the features characterizing the invention will be pointed out with particularity in the claims annexed to and forming a part of this specification.

SUMMARY OF THE INVENTION

Briefly, the present invention is a modular leakage current detector and circuit interrupter including a sense module for detecting ground fault currents in excess of a given value, the sense module including circuitry to provide an interrupt signal, a circuit interrupter interconnected to the sense module to disconnect power to the machine upon receipt of the interrupt signal, and a test and control module electrically connected to the sense module, the test and control module providing a fault signal to periodically test the operability of and reset the modular leakage current detector and machine interrupter.

DESCRIPTION OF THE DRAWINGS

For a better understanding of the present invention, reference may be had to the accompanying drawings wherein the same reference numerals have been applied to like parts and wherein.

DETAILED DESCRIPTION OF THE INVENTION

Figure 1:
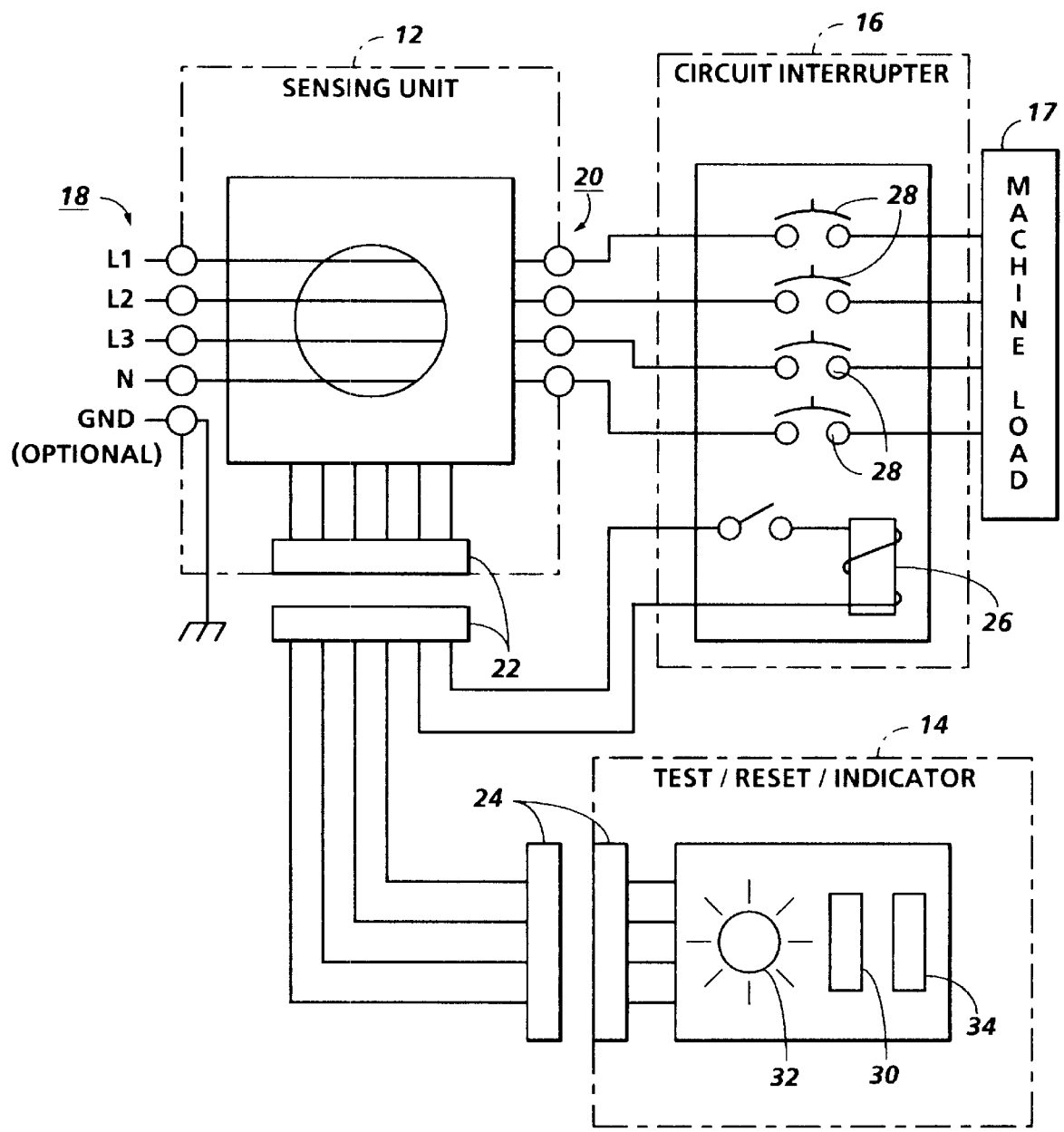
FIG. 1 is an illustration of the modular components of the ground fault protection system in accordance with the present invention.

With reference to FIG. 1, there is shown the equipment leakage circuit interrupter (ELCI) in accordance with the present invention, in particular, a sense module generally shown at 12, a switch or test/reset module generally shown at 14, and a circuit interrupter module generally shown at 16 interconnected to any suitable machine load shown at 17. The sense module 12 includes suitable AC power input connections generally shown at 18 and suitable output terminations generally shown at 20 for interconnection to the circuit interrupter module 16 as well as suitable connectors 22 for interconnecting the sense module 12 to the connectors 24 of the test/reset module 14 and to the trip coil 26 of the circuit interrupter module 16. In addition, the sense module 12 includes internal circuitry shown in FIGS. 2, 3, and 4 for self powering the equipment leakage circuit interrupter, for detecting ground fault current, actuation of the circuit interrupter module 16, and to interface with the test/reset module 14. As illustrated the AC power input terminations 18 interconnect to AC power lines L1, L2, L3, and neutral. In addition a suitable ground connector GND as illustrated is an option.

As will be more fully explained with reference to FIGS. 2, 3, and 4, AC power at input termination 18 flows through the sense module 12 and from the output terminations 20 to the circuit interrupter module 16. Power then flows with the normally closed contact elements 28 in the closed position, to machine load 17. Upon detection of a fault in the sensed module 12, trip coil 26 is driven to open the contacts 28 of the circuit interrupter module 16 to arrest the flow of AC power to machine load 17.

The internal circuitry of the sense module 12 detects ground fault currents in excess of predetermined values and upon detection, provides a signal to the circuit interrupter module 16. The signal is provided to the circuit interrupter module 16 in sufficient time to allow the circuit interrupter module 16 to disconnect the power to the load 17 within time specified by applicable safety standards.

The internal circuitry also interfaces with the test/reset module 14 to receive a test signal from the test/reset module 14 causing a fault current to be generated within the sense module 12 for purposes of testing the integrity of the system. The test signal is provided by the test switch 30 of the test/reset module 14 and an indication of the fault condition is provided at the test/reset module 14 by any suitable lamp or indicator 32. A reset signal to the sense module 12 is provided by the switch or button 34 of the test/reset module 14 to reset the sense module 12.

The circuit interrupter may be either a trip coil circuit breaker as shown at 26 or a power contactor. As shown in FIG. 1, upon the detection of a fault, the sense module 12 provides a DC voltage output at 22 to the circuit breaker trip coil 26 causing the breaker contacts 28 to open. Alternatively, an AC voltage output may be provided by the sense module 12. This AC voltage output, equal to line to neutral input voltage normally present during non-fault conditions causes a power contactor to open upon the detection of a fault. In other words, when a power contactor is utilized, the coil of the power contacter is energized from the AC voltage present at an output of the sense module 12 when the system is in a non-faulted condition.

In accordance with the present invention, the sense module 12 is self powered by an internal power supply operating from the line input. This power supply drives the circuitry when there is at least minimum, operating voltage between any two input lines including neutral. Preferably, the system operates with an input of approximately 70 to 416 volts, 50 or 60 cycles, and 2 to 4 wire, single or multi phase with an input current of 50 amps or less.

Figure 2:
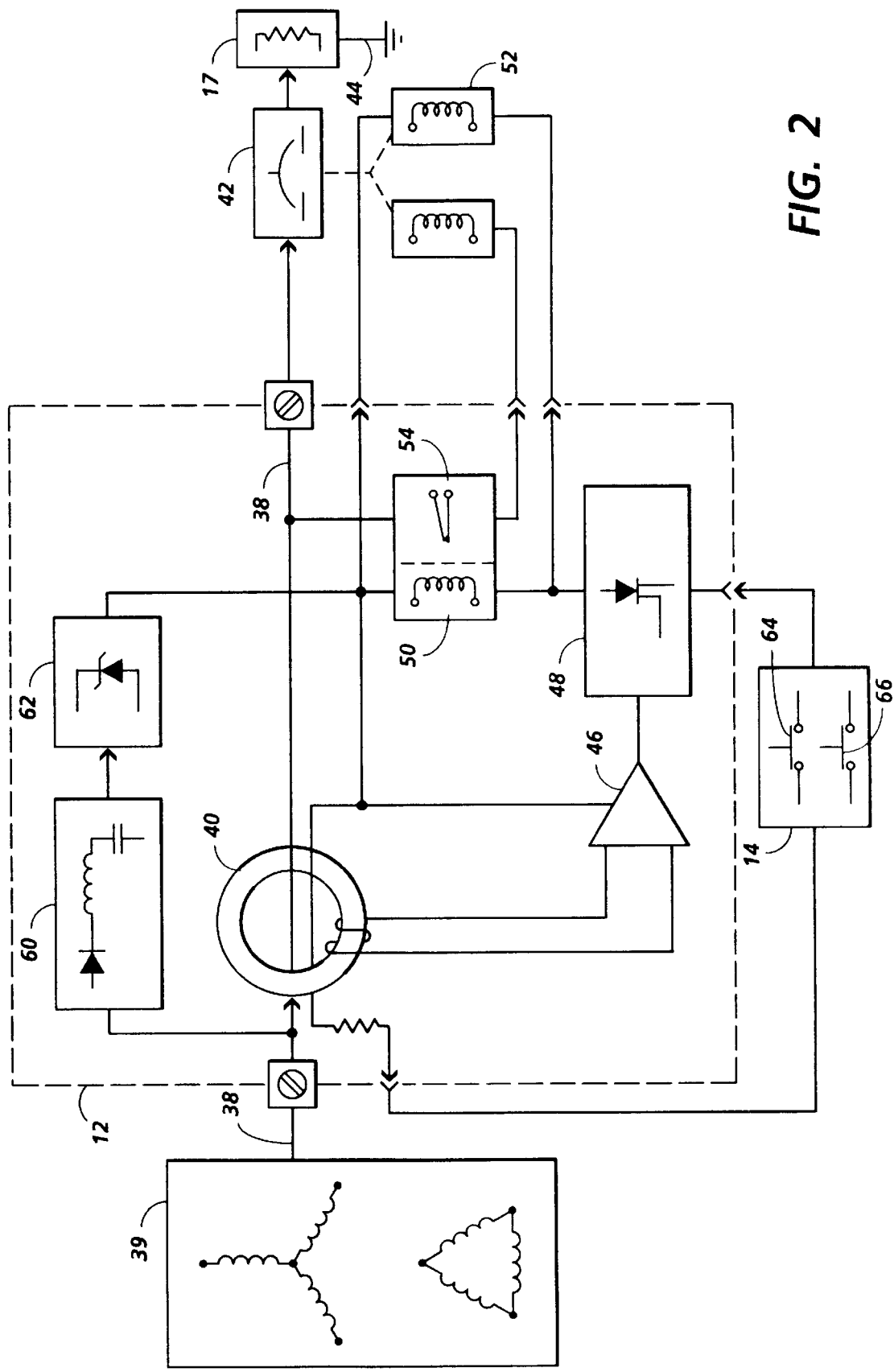
FIG. 2 is a block diagram of the ground fault protection system in accordance with the present invention.
Figure 3:
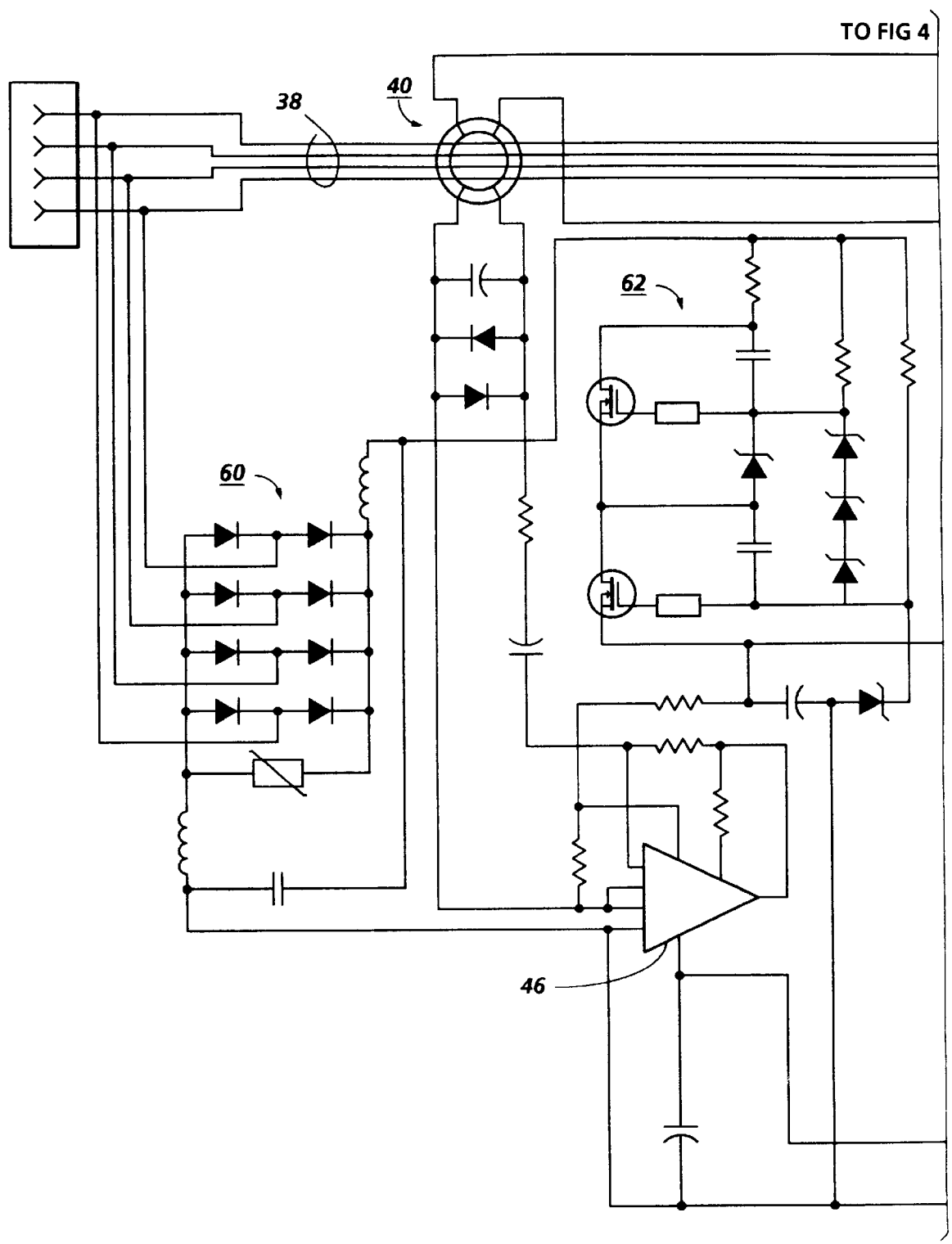
FIGS. 3 and 4 are a schematic of the ground fault protection system in accordance with the present invention.
Figure 4:
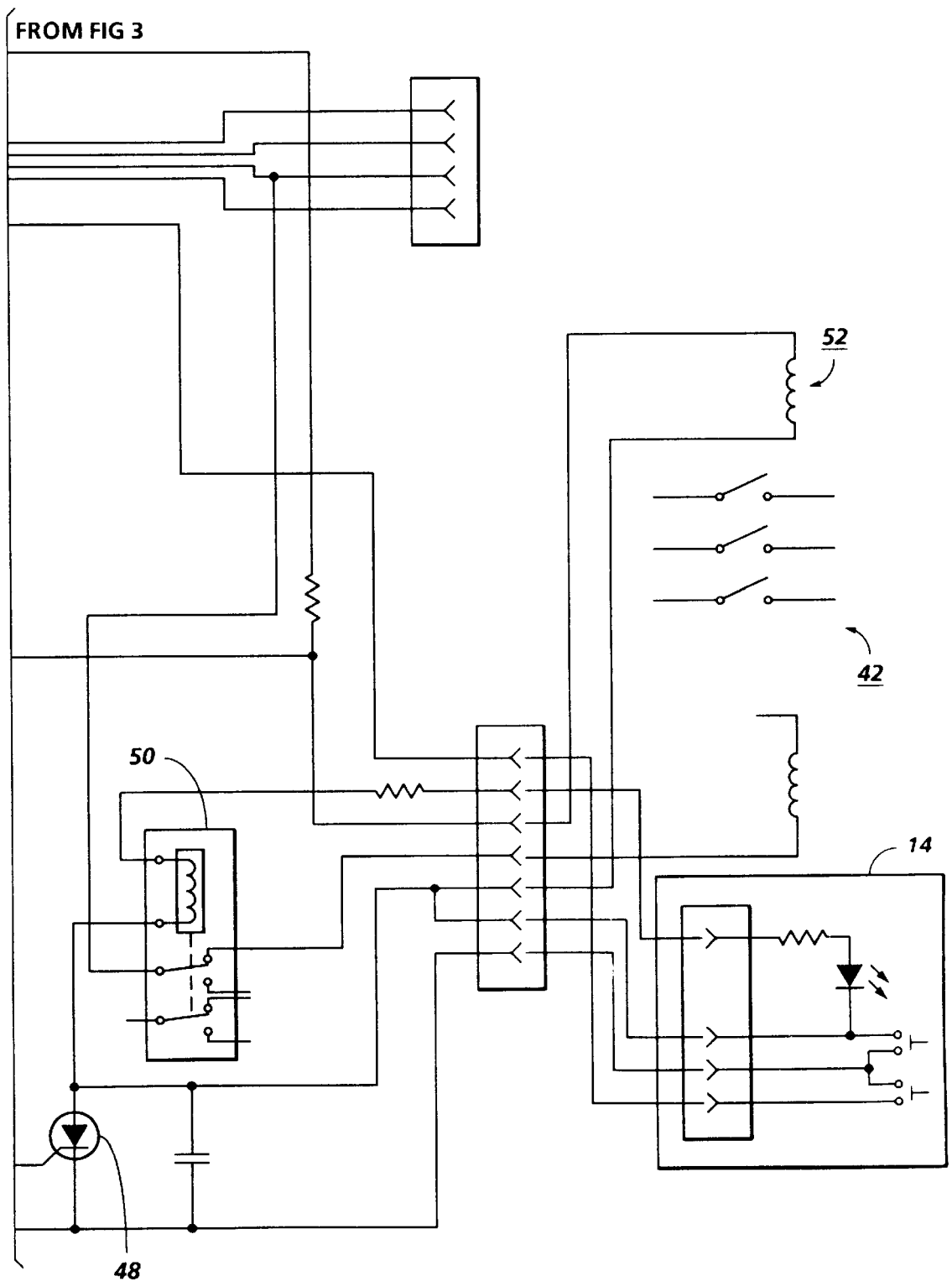

With reference to FIGS. 2, 3 and 4, line 38 represents power conductors (2, 3, or 4 conductors) passing through the inside diameter of sensing transformer 40 of the sense module 12 and through the contacts of a circuit breaker 42 to the load 17. There is no other path for the low current flow, and therefore, the instantaneous sum of the current flowing through the conductors which pass through the inside diameter of the transformer 40 is zero. It should be noted that there is a grounding conductor generally illustrated at 44 provided from an earth grounding point at the service entrance to the loads enclosure which does not pass through the inside diameter of the sense transformer. No current flows in this conductor.

In operation, when a ground fault occurs, the fault current flows from one or more of the power conductors in line 38 through the grounding conductor or earth ground 44 back to the service entrance. This creates an imbalance of current in the power and/or neutral conductors. This imbalance is a virtual primary current in the sensing transformer 40 which produces a signal voltage to the amplifier 46. The signal to the amplifier 46 is proportional to the imbalance. The amplifier 46 converts this signal to a DC pulse when the amplitude of the groundfault reaches a predetermined level, preferable between the range of 6 to 10 milliamperes. The DC pulse from amplifier 46 is applied to the gate of a silicon controlled rectifier SCR 48 which switches into conduction and energizes the coil of the relay 50 or the the shunt trip coil 52. It should be noted that the relay 50 and the shunt trip coil 52 are alternative and only one is necessary for operation of the present invention.

Operating the relay 50, de-engerizes the contact 54 to close the contacts 54 to remove power from the load 17. On the other hand, energizing the shunt trip coil opens the contacts of the circuit breaker 42 to remove power from the load. The system can not be reset until either the groundfault is removed or reduced to a level below 6 milliamperes. A DC power supply generally illustrated by rectifier/filter 60 and regulator 62, regulate DC power for amplifier 46, shunt trip coil 52, SCR 48, and relay 50.

The test/reset module 14 includes two switches generally shown at 64 and 66 to provide contact closure inputs to the sense module 12 for the test and reset functions. In particular, the test switch 64 connected to a separate coil on the sense transformer 40, shorts this test loop winding of the sensing transformer 40 to DC common which causes an impulse current to flow from the regulated DC supply 60. This causes an imbalance or fault current to flow to the amplifier 46. After a fault is removed or after the sensing of the test loop, the SCR circuit 48 is reset by the reset switch 66 which shorts out the holding current or the SCR 48.

It should be noted that because of the modularity of the sense module 12, test/reset module 14, and circuit interrupter module 16, the various modules can be mounted remotely from one another for the most optimum component location. In addition, the circuit interrupter module 16 can vary in the number of poles, current and voltage rating for safety agency approval to suit a particular application. A trip coil circuit breaker would necessitate only slight cost and space requirements over convention units and allow integration of the ground fault protection system easily into an existing product.

While there has been illustrated and described what is at present considered to be a preferred embodiment of the present invention, it will be appreciated that numerous changes and modifications are likely to occur to those skilled in the art, and it is intended in the appended claims to cover all those changes and modifications which fall within the true spirit and scope of the present invention.

What is claimed is:

1. A modular leakage current detector and interrupter comprising:

a sense module for detecting ground fault currents in excess of a given value, the sense module including circuitry to provide an interrupt signal, a circuit interrupt module mounted remote from the sense module and interconnected to the sense module to disconnect power to the machine upon receipt of the interrupt signal, and a test and control module mounted remote from the sense module, the test and control module providing a fault signal to periodically test the operability of the modular leakage current detector and interrupter.

2. The modular leakage current detector and interrupter of claim 1 wherein the circuit interrupt module a shunt trip and a shunt trip coil and the test and control module includes a reset switch to reset the sense module in response to ground fault current in the range of 6 to 10 milliamps.

3. The module leakage current detector and interrupter of claim 1 wherein the interrupt module includes a power supply including a rectifier/filter and a regulator for regulating DC power for said amplifier and shunt trip coil electrically connected to line current.

4. The modular leakage current detector and interrupter of claim 1 wherein the circuit interrupt module includes a shunt trip and a shunt trip coil.

5. A modular leakage current detector and interrupter to arrest the flow of line current to an electrical load comprising:

a sense module for detecting ground fault currents in the load in excess of a given value, the sense module including a power supply electrically connected to the line current, the power supply including a rectifier/filter and a regulator, interrupt circuitry responsive to the sense module to provide an interrupt signal, a circuit interrupter module responsive to the interrupt signal to disconnect line current to the load, and a test and control module electrically connected to the sense module, the test and control module adapted for mounting remote from the sense module, the test and control module triggering the sense module to test the integrity of the modular leakage current detector and interrupter and including an indicator to manifest a fault condition.

6. The modular leakage current detector and interrupt of claim 5 wherein the test and control module includes a test switch to trigger the sense module.

7. The modular leakage current detector and interrupter of claim 1 wherein the test and control module includes a reset switch to reset the sense module upon the ground fault current being reduced to a level below 10 milliamps.

* * * * *